United States Patent
Xu et al.

(10) Patent No.: US 9,926,406 B2
(45) Date of Patent: Mar. 27, 2018

(54) GREEN POLYTHIOPHENE ELECTROCHROMIC MATERIALS, METHOD FOR PREPARATION THEREOF, AND ASSEMBLY COMPRISING THE SAME

(71) Applicants: BOE TECHNOLOGY GROUP CO., LTD., Beijing (CN); UNIVERSITY OF SCIENCE AND TECHNOLOGY OF CHINA, Hefei, Anhui (CN)

(72) Inventors: Chunye Xu, Beijing (CN); Sai Mi, Beijing (CN); Jianming Zheng, Beijing (CN)

(73) Assignees: BOE TECHNOLOGY GROUP CO., LTD., Beijing (CN); UNIVERSITY OF SCIENCE AND TECHNOLOGY OF CHINA, Hefei, Anhui (CN)

( * ) Notice: Subject to any disclaimer, the term of this patent is extended or adjusted under 35 U.S.C. 154(b) by 371 days.

(21) Appl. No.: 14/436,701

(22) PCT Filed: Sep. 5, 2014

(86) PCT No.: PCT/CN2014/086066
§ 371 (c)(1),
(2) Date: Apr. 17, 2015

(87) PCT Pub. No.: WO2015/081737
PCT Pub. Date: Jun. 11, 2015

(65) Prior Publication Data
US 2016/0024245 A1    Jan. 28, 2016

(30) Foreign Application Priority Data
Dec. 6, 2013 (CN) .......................... 2013 1 0658615

(51) Int. Cl.
*C08G 61/12* (2006.01)
*C09K 9/02* (2006.01)
*H01B 1/12* (2006.01)
*C08G 61/00* (2006.01)

(52) U.S. Cl.
CPC ......... *C08G 61/126* (2013.01); *C08G 61/122* (2013.01); *C09K 9/02* (2013.01); *H01B 1/12* (2013.01); *C08G 2261/11* (2013.01); *C08G 2261/148* (2013.01); *C08G 2261/1424* (2013.01); *C08G 2261/3223* (2013.01); *C08G 2261/3241* (2013.01); *C08G 2261/3247* (2013.01); *C08G 2261/364* (2013.01); *C08G 2261/43* (2013.01); *C08G 2261/54* (2013.01); *C08G 2261/64* (2013.01)

(58) Field of Classification Search
CPC .............. C08G 61/126; C08G 2261/11; C08G 2261/43; C08G 2261/54; C08G 2261/1424; C08G 2261/148; C08G 2261/3223; C08G 2261/3241

USPC .................... 359/265; 526/75, 256; 528/380
See application file for complete search history.

(56) References Cited

FOREIGN PATENT DOCUMENTS

| CN | 101591425 A | 12/2009 |
|---|---|---|
| CN | 103450226 A | 12/2013 |
| CN | 103772664 A | 5/2014 |
| WO | 2009126118 A1 | 10/2009 |

OTHER PUBLICATIONS

Serap Gunes et al., "A Green nuetral satate donor-aceptor copolymer for organic solar cells", Polymer Chemistry, May 2010, vol. 1 pp. 1245-1251
International Search Report Appln. No. PCT/CN2014/086066; dated Dec. 17, 2014.
Written Opinion of the International Searching Authority Appln. No. PCT/CN2014/086066; dated Dec. 17, 2014.
First Chinese Office Action Appln. No. 201310658615.9; dated Jul. 3, 2015.
Second Chinese Office Action dated Nov. 10, 2015; Appln. No. 201310658615.9.
Zhao Wenyual et al. "12.4.4 The Application of Higher Polymer Electroluminescent Materials", Functional Macromolecule Material Chemistry, p. 285, Chemistry Industry Press, Sep. 2003.
Third Chinese Office Action dated May 17, 2016; Appln. No. 201310658615.9.

*Primary Examiner* — Fred M Teskin
(74) *Attorney, Agent, or Firm* — Ladas & Parry LLP (57) ABSTRACT

A novel soluble green polythiophene electrochromic material, poly[2,3-bis(3,4-dialkoxyphenyl)-5,8-bis(3,4-ethylenedioxythienyl)quinoxaline], as shown by formula (I),

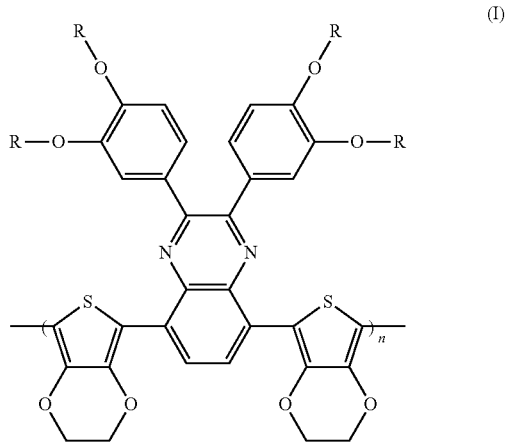

wherein, n is an integer from 40 to 200, $R=C_mH_{2m+1}$, wherein m is an integer from 8 to 14.

15 Claims, 4 Drawing Sheets

GREEN POLYTHIOPHENE ELECTROCHROMIC MATERIALS, METHOD FOR PREPARATION THEREOF, AND ASSEMBLY COMPRISING THE SAME

TECHNICAL FIELD

Embodiments of the present invention relate to a soluble green polythiophene electrochromic material, method for preparation thereof, and assembly comprising the same.

BACKGROUND

Electrochromic materials have been one of focuses in material science researches in recent years. Polymer electochromic materials have advantages of better coloring efficiency; fast electrochromic response; good chemical stability; easy preparation; longer cycle life; possession of color-memory function; and adjustable color shade, as compared to inorganic or organic small molecule electrochromic materials.

Rigidity of electroconductive polymer backbones usually imparts insoluble and infusible properties to polythiophene. Conventionally, polymer films are formed on the surface of an electrode via electrochemical polymerization. However, it is difficult to produce electrochromic devices on a large scale via electrochemical polymerization. Recently, the researchers have achieved sprayable operation of polythiophene electrochromic materials by incorporating various forms of side groups into the polythiophene derivatives with chemical modification methods to weaken interaction between polymer molecule chains such that polymers can be dissolved in organic solvents.

Among three primary colors, worldwide scientists have early researched and developed blue and red polythiophene electrochromic materials. However, the first type of green polythiophene electrochromic materials has not been synthesized by Wudl until 2004. Only a few of kinds of green polythiophene electrochromic materials have an ability to dissolve in organic solvents and form a film via spraying. Known green polythiophene electrochromic materials generally have poor transmittance difference and short cycle life.

It is rarely reported domestically as to the green polythiophene electrochromic materials, preparation and application thereof. In view of that, the present invention is provided.

SUMMARY OF INVENTION

An embodiment of the present invention provides a green polythiophene electrochromic material as shown by formula (I), poly[2,3-bis(3,4-dialkoxyphenyl)-5,8-bis(3,4-ethylenedioxythienyl)quinoxaline], wherein, n is an integer from 40 to 200, $R=C_mH_{2m+1}$, wherein m is an integer from 8 to 14.

An embodiment of the present invention provides a method for preparing the polymer as shown above, comprising:

Step 1: reacting catechol with alkyl bromide having an alkyl chain length of 8-14 carbon atoms in the presence of potassium hydroxide to give 1,2-dialkoxybenzene, compound 1;

Step 2: allowing compound 1 and oxalyl chloride to undergo an electrophilic substitution reaction in the presence of anhydrous aluminum chloride, to give 1,2-bis(3,4-dialkoxyphenyl)-1,2-dione, compound 2;

Step 3: allowing 2,1,3-benzothiadiazole and bromine to undergo halogenation, to give 4,7-dibromo-2,1,3-benzothiadiazole, compound 3;

Step 4: allowing compound 3 and sodium borohydride to undergo a reduction reaction, to give 3,6-dibromo-o-phenylenediamine, compound 4;

Step 5: reacting compound 2 with compound 4 under the catalyzation of p-toluenesulfonic acid, to give 2,3-bis(3,4-dialkoxyphenyl)-5,8-dibromoquinoxaline, compound 5;

Step 6: reacting 3,4-ethylenedioxythiophene with n-butyllithium and tributyltin chloride, to give 2-tributyltin-3,4-ethylenedioxythiophene, compound 6;

Step 7: allowing compound 5 and compound 6 to undergo a stille coupling reaction under the catalyzation of bis(triphenylphosphine)palladium dichloride or palladium acetate, to give 2,3-bis(3,4-dialkoxyphenyl)-5,8-bis(3,4-ethylenedioxythienyl)quinoxaline, compound 7;

Step 8: polymerizing compound 7 under catalytic oxidation from ferric trichloride, to give poly[2,3-bis(3,4-dialkoxyphenyl)-5,8-bis(3,4-ethylenedioxythienyl)quinoxaline], compound 8.

An embodiment of the present invention provides use of said green polythiophene electrochromic material for preparing an electrochromic device.

An embodiment of the present invention further provides an assembly comprising said green polythiophene electrochromic material poly[2,3-bis(3,4-dialkoxyphenyl)-5,8-bis(3,4-ethylenedioxythienyl)quinoxaline].

BRIEF DESCRIPTION OF DRAWINGS

The figures useful for the examples or a prior solution will be simply described in order to illustrate the embodiments of the present invention or the technical solution in the prior art more clearly. It is apparent that the described figures represent only a portion of the examples of the present invention. Based on these figures, persons of ordinary skill in the art can obtain other figures without creative work.

DETAILED DESCRIPTION OF INVENTION

The present disclosure relates to a novel soluble green polythiophene electrochromic material, which can change color between green and transparency. Said polymeric material can be dissolved in polar organic solvents, and thus can form a film on the surface of ITO glass via solution spin-coating or spraying. The resulting film has characteristics of low driving voltage, fast response time, transparent oxidation state and high transmittance, and can be useful for devices including electrochromic window, rearview mirror, electrochomeric display, and the like.

An embodiment of the present invention provides a green polythiophene electrochromic material as shown by formula (I), poly[2,3-bis(3,4-dialkoxyphenyl)-5,8-bis(3,4-ethylenedioxythienyl)quinoxaline], wherein, n is an integer from 40 to 200, R=C$_m$H$_{2m+1}$, wherein m is an integer from 8 to 14.

Preferably, m is an integer from 10-12.

Taking an example of m=8, the resulting polymer is poly[2,3-bis(3,4-di octyloxyphenyl)-5,8-bis(3,4-ethylenedioxythienyl)quinoxaline].

The polymers according to the embodiment of the present invention have a number-average molecular weight in the range of 20000 to about 100000, and preferably in the range of 50000-70000.

For example, when m=12, the material is poly[2,3-bis(3,4-di(dodecyloxy)phenyl)-5,8-bis(3,4-ethylenedioxythienyl)quinoxaline] as shown by formula (II)

wherein, n is an integer from 40 to 200.

Said polymers have desired physical and chemical properties, can change color between green and transparency, and have a cycle life greater than ten thousand times. The polymers can be sprayed on the surface of the ITO glass to form a film. The resulting film has characteristics of low driving voltage (within ±1V), fast response time (in 3 s), and large transmittance difference between colored-state and bleached-state (up to 50%). Therefore, the polymers can be useful for devices including electrochromic window, rearview mirror, electrochomeric display, and the like.

An embodiment of the present invention provides a method for preparing the polymer as shown above, comprising:

Step 1: reacting catechol with alkyl bromide having an alkyl chain length of 8-14 carbon atoms in the presence of potassium hydroxide to give 1,2-dialkoxybenzene, compound 1;

Step 2: allowing compound 1 and oxalyl chloride to undergo an electrophilic substitution reaction in the presence of anhydrous aluminum chloride, to give 1,2-bis(3,4-dialkoxyphenyl)-1,2-dione, compound 2;

Step 3: allowing 2,1,3-benzothiadiazole and bromine to undergo halogenation, to give 4,7-dibromo-2,1,3-benzothiadiazole, compound 3;

Step 4: allowing compound 3 and sodium borohydride to undergo a reduction reaction, to give 3,6-dibromo-o-phenylenediamine, compound 4;

Step 5: reacting compound 2 with compound 4 under the catalyzation of p-toluenesulfonic acid, to give 2,3-bis(3,4-dialkoxyphenyl)-5,8-dibromoquinoxaline, compound 5;

Step 6: reacting 3,4-ethylenedioxythiophene with n-butyllithium and tributyltin chloride, to give 2-tributyltin-3,4-ethylenedioxythiophene, compound 6;

Step 7: allowing compound 5 and compound 6 to undergo a stille coupling reaction under the catalyzation of bis(triphenylphosphine)palladium dichloride or palladium acetate, to give 2,3-bis(3,4-dialkoxyphenyl)-5,8-bis(3,4-ethylenedioxythienyl)quinoxaline, compound 7;

Step 8: polymerizing compound 7 under catalytic oxidation from ferric trichloride, to give poly[2,3-bis(3,4-dialkoxyphenyl)-5,8-bis(3,4-ethylenedioxythienyl)quinoxaline], compound 8.

Here, in step 1, the ratio of catechol to alkyl bromide in mole is from 1:2 to 1:4, and preferably 1:3. The reaction solvent is ethanol. The reaction temperature is from 60 to 80° C., and preferably 60° C. The reaction time is from 4 to 10 hours, and preferably 10 hours. Under such conditions, the reaction has advantages of saving starting materials and increasing reaction yield.

In step 2, the ratio of compound 1 to anhydrous aluminum chloride in mole is from 1:1 to 1:1.2, and preferably 1:1.1. The ratio of compound 1 to oxalyl chloride in mole is from 1:0.5 to 1:0.6, and preferably 1:0.6. The reaction solvent is carbon disulfide. The reaction temperature is 0° C. The reaction time is from 18 to 24 hours, and preferably 24 hours. Under such conditions, the reaction yield can be enhanced.

In step 3, the ratio of 2,1,3-benzothiadiazole to bromine in mole is from 1:2 to 1:4, and preferably 1:3. The reaction solvent is an aqueous hydrobromic acid solution (mass concentration 14%). The reaction temperature is from 80 to 100° C., and preferably 80° C. The reaction time is from 8 to 12 hours and preferably 12 hours. Under such conditions, the reaction yield can be enhanced.

In step 4, the ratio of compound 3 to sodium borohydride in mole is from 1:5 to 1:10, and preferably 1:10. The reaction solvent is ethanol. The reaction temperature is room temperature. Under such conditions, the reaction yield can be enhanced.

In step 5, the ratio of compound 2 to compound 4 in mole is from 1:1 to 1:1.2, and preferably 1:1. The catalyst is p-toluenesulfonic acid in an amount of 5-10 wt % of compound 4, and preferably 10 wt %. The reaction solvent is trichloromethane or ethanol, and preferably trichloromethane. The reaction temperature is from 60 to 80° C., and preferably 80° C. The reaction time is from 10 to 12 hours, and preferably 12 hours. Under such conditions, the reaction has advantages of saving starting materials and increasing reaction yield.

In step 6, the ratio of 3,4-ethylenedioxythiophene to n-butyllithium in mole is from 1:1 to 1:1.2, and preferably 1:1.2. The reaction is conducted at −78° C. with stirring for 0.5-1 hour, and preferably 1 hour. The ratio of 3,4-ethylenedioxythiophene to tributyltin chloride in mole is from 1:1 to 1:1.2, and preferably 1:1.2. The reaction is conducted at room temperature for 16-24 hours, and preferably 24 hours. Under such conditions, the reaction yield can be enhanced.

In step 7, the ratio of compound 5 to compound 6 in mole is from 1:2 to 1:2.5, and preferably 1:2.5. The reaction solvent is anhydrous tetrahydrofuran. The catalyst is bis(triphenylphosphine)palladium dichloride or palladium acetate, and preferably bis(triphenylphosphine)palladium dichloride, in an amount of 5-10 wt % of compound 5, and preferably 8 wt %. The reaction temperature is from 70 to 100° C., and preferably 80° C. The reaction time is from 24 to 48 hours, and preferably 48 hours. Under such conditions, the reaction yield can be enhanced.

In step 8, the ratio of compound 7 to ferric trichloride in mole is from 1:3 to 1:5, and preferably 1:5. The reaction is conducted at room temperature with stirring for 24-48 hours, and preferably 48 hours. Under such conditions, the reaction yield and polymerization degree can be enhanced.

The method described above is well designed and achieves a desired yield for each step. Moreover, the final product has a purity of up to 99%. As an exemplary embodiment, the method is shown as follows:

-continued (1) Catechol (55 g, 0.5 mol), potassium hydroxide (84.2 g, 1.5 mol), 200 ml of ethanol and dodecyl bromide (375 g, 1.5 mol) are charged into a round bottom flask that is equipped with a condensation tube, and react at 60° C. for 10 h. The reactant is dissolved by addition of water, extracted with diethyl ether, and dried over anhydrous sodium sulfate. After passing through a chromatographic column, a white floccule solid is given, compound 1, with a yield of 80%.

(2) Compound 1 (8.92 g, 20 mmol), aluminum chloride (2.93 g, 22 mmol), and 50 ml of carbon disulfide are charged into a round bottom flask. Oxalyl Chloride (1.52 g, 12 mmol) is dissolved in 10 ml of carbon disulfide. The mixture is added dropwise at 0° C. to the flask and violently stirred for 24 hrs. The reactant is concentrated via rotary evaporation at reduced pressure. Deionized water is added and the resulting solution is extracted with dichlormethane. The organic phase is dried over anhydrous magnesium sulfate, concentrated via rotary evaporation at reduced pressure, and then passed through a chromatographic column, to give a white solid, compound 2, with a yield of 70%.

(3) 2,1,3-benzothiadiazole (10 g, 73.4 mmol) and 150 ml of hydrobromic acid (14% aqueous solution) are charged into a round bottom flask, to which a mixed solution of $Br_2$ (35.2 g, 220.3 mmol) and hydrobromic acid (100 ml) is added dropwise. The mixture is heated to 80° C., refluxed for 12 hrs, and then cooled to room temperature. An excess of sodium thiosulfate is added to the reaction to remove excess bromine. The crude is washed with water for several times and the resulting solid is washed once with diethyl ether. The solvent is evaporated to give compound 3 with a yield of 85%.

(4) Compound 3 (5 g, 17 mmol) and 170 ml of ethanol are charged into a round bottom flask, to which sodium borohydride (6.4 g, 170 mmol) is added in portions at 0° C. After completing the addition, the mixture is stirred at room temperature for 20 hrs. Appropriate deionized water is added and the reaction is extracted with diethyl ether. The organic phase is dried over anhydrous magnesium sulfate and passed through a chromatographic column, to give an offwhite flaky solid, compound 4, with a yield of 90%.

(5) Compound 2 (7.2 g, 7.6 mmol), compound 4 (2.0 g, 7.6 mmol), p-toluenesulfonic acid (0.15 g, 0.76 mmol) and 80 ml of ethanol are charged into a round bottom flask, refluxing at 80° C. for 12 hrs. The reaction is filtered to give a precipitate, which is washed with ethanol for several times. The crude is passed through a chromatographic column, to give a faint yellow solid, compound 5, with a yield of 83%.

(6) 3,4-ethylenedioxythiophene (0.77 g, 5.4 mmol) is dissolved in 30 ml of anhydrous tetrahydrofuran and cooled to −78° C. 2.7 ml of a solution of n-butyllithium in n-hexane at a concentration of 2.4M is added to the reaction system in 2 hrs at a constant speed. After that, the reaction is stirred for 1 hr, to which tributyltin chloride (2.1 g, 6.5 mmol) is injected and stirred for 0.5 h. The system is left at room temperature with stirring for 24 hrs. The solvent is removed via rotary evaporation, to give a yellow oily liquid, compound 6, with a yield of 80%.

(7) Compound 5 (1.77 g, 1 mmol) and compound 6 (1.1 g, 2.5 mmol) are charged into a round bottom flask, to which 20 ml of anhydrous THF and 0.056 g of bis(triphenylphosphine)palladium dichloride catalyst are added. The reaction mixture is heated to 80° C. for 48 hrs. The solvent is removed via rotary evaporation. The residue is passed through a chromatographic column, to give an orange red solid, which is an electrochromic monomer, compound 7, with a yield of 70%.

(8) Compound 7 (0.94 g, 0.723 mmol) is added to 100 ml of trichloromethane, to which a solution of ferric trichloride in nitromethane (0.58 g, 3.615 mmol) and stirred at room temperature for 48 hrs. The resulting mixed solution is added to 800 ml of methanol. The mixture is filtered and the precipitate is remained. The precipitate is dissolved in trichloromethane, to which an excess of hydrazine hydrate is added and stirred for 8 hrs. The organic phase is added to 800 ml of methanol and filtered. The resulting precipitate is washed with methanol for several times, to give a polymeric electrochromic material, compound 8, with a yield of 86%.

Moreover, in the reaction scheme shown above, reference numbers 1-8 for the specific compounds involved in the reaction only represent a preferred embodiment for preparing compounds 1-8 of the present invention. The reference numbers 1-8 are not solely corresponding to compounds 1-8. Such references shown herein are only for the purpose of easy understanding and not intended to limit the protection scope and specific technical solutions of the present invention.

An embodiment of the present invention provides use of said green polythiophene electrochromic material for preparing an electrochromic device. Herein, the electrochromic device includes, but is not limited to electrochromic window, rearview mirror, electrochomeric display.

An embodiment of the present invention further provides an assembly comprising said green polythiophene electrochromic material poly[2,3-bis(3,4-dialkoxyphenyl)-5,8-bis(3,4-ethylenedioxythienyl)quinoxaline].

Said assembly according to the embodiment of the present invention is for example an electrochromic film. The electrochromic film has characteristics of low driving voltage (oxidizing potential and reducing potential are 0.6V and 0.25V, respectively), fast response time (95% of the time required by the current changing from the maximum to zero is the response time, and coloring time and bleaching time are 2.0 s and 2.5 s, respectively), pure color (selectively transmitting green color at a wavelength range of 500-600 nm in visible light region), transparent oxidation state and high transmittance (transmittance is up to 71% at 590 nm, up to 53% at 650 nm, and up to 48% at 462 nm).

The electrochromic film according to the embodiment of the present invention can be prepared by any film-forming method disclosed in the prior art. For example, a uniform electrochromic film is formed by dissolving compound 8 (poly[2,3-bis(3,4-dialkoxyphenyl)-5,8-bis(3,4-ethylenedioxythienyl)quinoxaline]) in trichloromethane to prepare a solution of 2-3 mg/ml, and spray the solution directly onto the surface of a ITO glass with an airbrush. The film formed by spraying is easily operable and more suitable for large-scale production, as compared to the conventional electroplating film-formation.

With the solution described above, the present disclosure provides a novel green polythiophene electrochromic material, the preparation thereof, and the use thereof. Said material is well dissolved in trichloromethane, and can be directly sprayed on the surface of the ITO glass to form a film. The material has characteristics of low driving voltage (within ±1V), fast response time, large transmittance difference between colored-state and bleached-state (up to 50%), and pure color. The material can be used in the electrochromic window, rearview mirror, electrochomeric display, and the like.

The disclosure of the present invention will be described in details through specific examples below. These examples are only illustrative, and should not be interpreted as limiting the scope of the present disclosure.

EXAMPLE 1

The preparation procedures in this example are specifically shown below:

(1) Catechol (55 g, 0.5 mol), potassium hydroxide (84.2 g, 1.5 mol), 200 ml of ethanol, and dodecyl bromide (375 g, 1.5 mol) are charged into a round bottom flask that is equipped with a condensation tube, and reacted at 60° C. for 10 h. The reactant is dissolved by addition of water, extracted with diethyl ether, and dried over anhydrous sodium sulfate. After passing through a chromatographic column, a white floccule solid is given, compound 1, with a yield of 80% and a purity of 95%.

(2) Compound 1 (8.92 g, 20 mmol), aluminum chloride (2.93 g, 22 mmol), and 50 ml of carbon disulfide are charged into a round bottom flask. Oxalyl Chloride (1.52 g, 12 mmol) is dissolved in 10 ml of carbon disulfide. The mixture is added dropwise at 0° C. to the flask and violently stirred for 24 hrs. The reactant is concentrated via rotary evaporation at reduced pressure. Deionized water is added and the resulting solution is extracted with dichlormethane. The organic phase is dried over anhydrous magnesium sulfate, concentrated via rotary evaporation at reduced pressure, and then passed through a chromatographic column, to give a white solid, compound 2, with a yield of 70% and a purity of 95%.

(3) 2,1,3-benzothiadiazole (10 g, 73.4 mmol) and 150 ml of hydrobromic acid (14% aqueous solution) are charged into a round bottom flask, to which a mixed solution of $Br_2$ (35.2 g, 220.3 mmol) and hydrobromic acid (100 ml) is added dropwise. The mixture is heated to 80° C., refluxed for 12 hrs, and then cooled to room temperature. An excess of sodium thiosulfate is added to the reaction to remove excess bromine. The crude is washed with water for several times and the resulting solid is washed once with diethyl ether. The solvent is evaporated to give compound 3 with a yield of 85% and a purity of 95%.

(4) Compound 3 (5 g, 17 mmol) and 170 ml of ethanol are charged into a round bottom flask, to which sodium borohydride (6.4 g, 170 mmol) is added in portions at 0° C. After completing the addition, the mixture is stirred at room temperature for 20 hrs. Appropriate deionized water is added and the reaction is extracted with diethyl ether. The organic phase is dried over anhydrous magnesium sulfate and passed through a chromatographic column, to give an offwhite flaky solid, compound 4, with a yield of 90% and a purity of 95%.

(5) Compound 2 (7.2 g, 7.6 mmol), compound 4 (2.0 g, 7.6 mmol), p-toluenesulfonic acid (0.15 g, 0.76 mmol) and 80 ml of ethanol are charged into a round bottom flask, refluxing at 80° C. for 12 hrs. The reaction is filtered to give a precipitate, which is washed with ethanol for several times. The crude is passed through a chromatographic column, to give a faint yellow solid, compound 5, with a yield of 83% and a purity of 95%.

(6) 3,4-ethylenedioxythiophene (0.77 g, 5.4 mmol) is dissolved in 30 ml of anhydrous tetrahydrofuran and cooled to −78° C. 2.7 ml of a solution of n-butyllithium in n-hexane at a concentration of 2.4M is added to the reaction system in 2 hrs at a constant speed. After that, the reaction is stirred for 1 hr, to which tributyltin chloride (2.1 g, 6.5 mmol) is injected and stirred for 0.5 h. The system is left at room temperature with stirring for 24 hrs. The solvent is removed via rotary evaporation, to give a yellow oily liquid, compound 6, with a yield of 80% and a purity of 95%.

(7) Compound 5 (1.77 g, 1 mmol) and compound 6 (1.1 g, 2.5 mmol) are charged into a round bottom flask, to which 20 ml of anhydrous TI-IF and 0.056 g of bis(triphenylphosphine)palladium dichloride catalyst are added. The reaction mixture is heated to 80° C. for 48 hrs. The solvent is removed via rotary evaporation. The residue is passed through a chromatographic column, to give an orange red solid, which is an electrochromic monomer, compound 7, with a yield of 70% and a purity of 95%.

(8) Compound 7 (0.94 g, 0.723 mmol) is added to 100 ml of trichloromethane, to which a solution of ferric trichloride (0.58 g, 3.615 mmol) in nitromethane is added dropwise and stirred at room temperature for 48 hrs. The resulting mixed solution is added to 800 ml of methanol. The mixture is filtered and the precipitate is remained. The precipitate is dissolved in trichloromethane, to which an excess of hydrazine hydrate is added and stirred for 8 hrs. The organic phase is taken, added to 800 ml of methanol and filtered. The resulting precipitate is washed with methanol for several times, to give a polymeric electrochromic material, compound 8, with a yield of 86% and a purity of 99%.

The polymer prepared in this example has a number-average molecular weight ($M_n$) of 58000.

Figure 1:
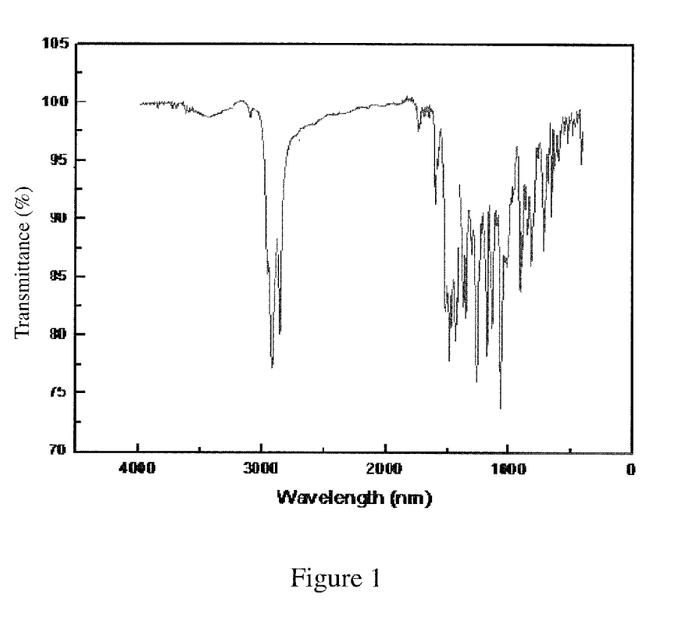
FIG. 1 shows Fourier transform infrared spectrum of a monomer prepared according to Example 1 of the present invention, wherein Y-axis represents the transmittance of infrared light, and X-axis represents wavelength.

The Fourier transform infrared spectrum of the monomer prepared in this example is shown in FIG. 1, in which x-axis represents wavelength, and y-axis represents transmittance. Here, peaks above 3000 nm are stretching vibration peaks of C—H bonds on the thiophene and benzene rings; peaks at 2700-3000 nm are stretching vibration peaks of saturated C—H bonds; peaks at 1400-1500 nm are backbone vibration peaks of the thiophene and benzene rings; peaks at 1000-1300 nm are stretching vibration peaks of C—O bonds; and peaks at 650-1000 nm are out-of-plane bending vibration peaks of C—H bonds.

Figure 2:
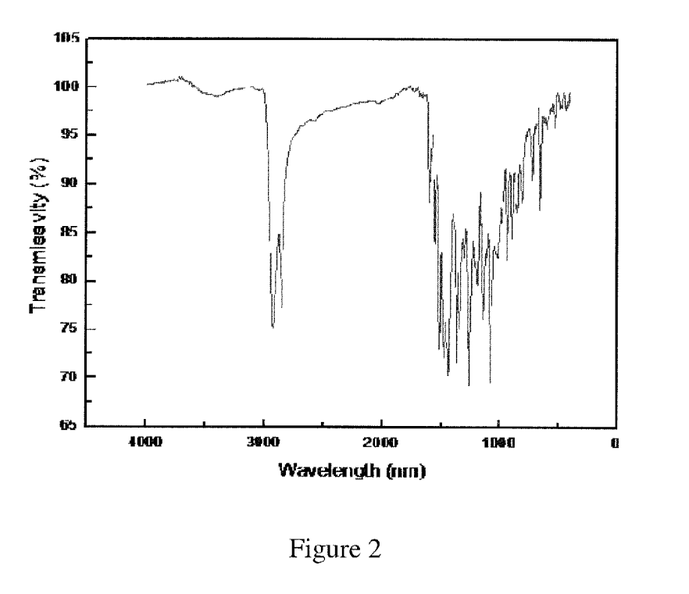
FIG. 2 shows Fourier transform infrared spectrum of a polymer prepared according to Example 1 of the present invention.

The Fourier transform infrared spectrum of the polymer prepared in this example is shown in FIG. 2. In FIG. 2, C—H stretching vibration peaks at 2,5-position of the thiophene ring (small sharp peaks at 3105 nm in FIG. 1) disappear, demonstrating polymerization of the monomer occurring at 2,5-position of the thiophene ring.

Figure 3:
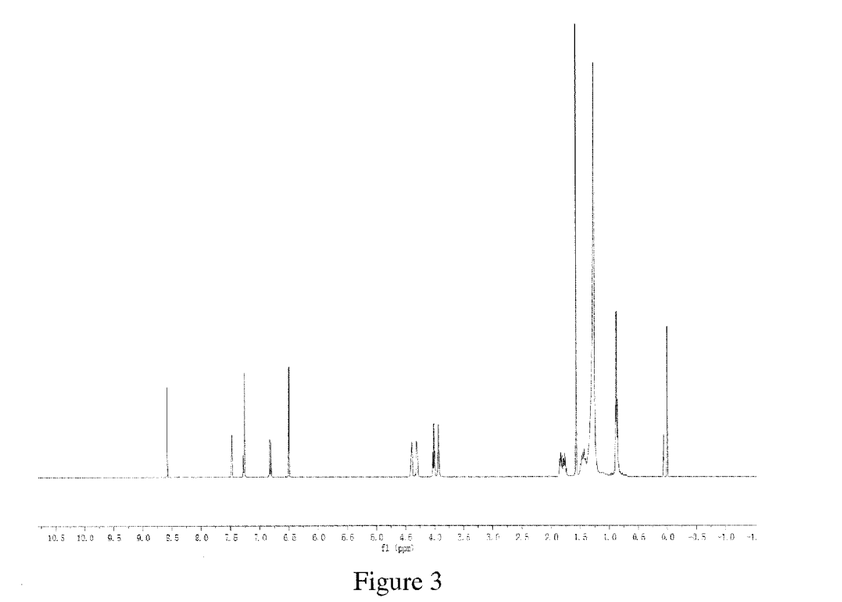
FIG. 3 shows $^1$H-NMR of a monomer prepared according to Example 1 of the present invention, wherein Y-axis represents peak intensity, and X-axis represents chemical shift.

$^1$H-NMR of the monomer prepared in this example is shown in FIG. 3, in which y-axis represents peak intensity, and x-axis represents chemical shift. In the spectrogram, peak at δ=8.58 corresponds to the hydrogen atoms at 6,7-position of quinoxaline; peak at δ=6.50 corresponds to the hydrogen atom at 5-position of the thiophene ring; peak at δ=7.47 corresponds to the hydrogen atom at 2-position of the benzene ring; peak at δ=7.26 corresponds to the hydrogen atom at 6-position of the benzene ring; peak at δ=6.82 corresponds to the hydrogen atom at 5-position of the benzene ring; peak at δ=4.39 corresponds to the hydrogen atom of the methylene group adjacent to quinoxaline at the 6-member ring linked to the thiophene ring; peak at δ=4.9 corresponds to the hydrogen atom of the methylene group away from quinoxaline at the 6-member ring linked to the thiophene ring; peak at δ=4.9 corresponds to the hydrogen atom of the methylene group proximate to the oxygen atom at the alkoxy group linked to 4-position of the benzene ring; peak at δ=3.93 corresponds to the hydrogen atom of the methylene group proximate to the oxygen atom at the alkoxy group linked to 3-position of the benzene ring; peak at δ=3.93 corresponds to the hydrogen atom of the methyl group at the end of the alkyl chain; peak at δ=1.0-2.0 corresponds to the hydrogen atom of the methylene group in the middle of the alkyl chain.

Figure 4:
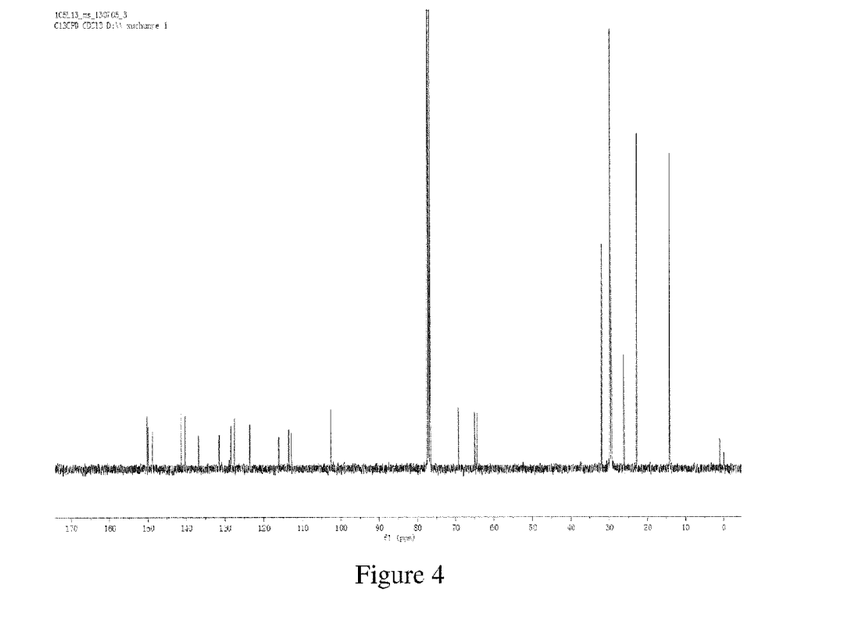
FIG. 4 shows $^{13}$C-NMR of a monomer prepared according to Example 1 of the present invention, wherein Y-axis represents peak intensity, and X-axis represents chemical shift.

$^{13}$C-NMR of the monomer prepared in this example is shown in FIG. 4, in which y-axis represents peak intensity, and x-axis represents chemical shift. In the spectrogram, peak at δ=127.6 corresponds to the carbon atoms at 6,7-position of quinoxaline; peak at δ=140.2 corresponds to the carbon atoms at 5,8-position of quinoxaline; peak at δ=149.9 corresponds to the carbon atoms between the carbon atoms of 5,8-position of quinoxaline and the nitrogen atoms (the carbon atoms here are un-numbered in systematic nomenclature); peak at δ=150.3 corresponds to the carbon atoms at 2,3-position of quinoxaline; peak at δ=123.6 corresponds to the carbon atom at 1-position of the benzene ring; peak at δ=113.5 corresponds to the carbon atom at 2-position of the benzene ring; peak at δ=141.3 corresponds to the carbon atom at 3-position of the benzene ring; peak at δ=148.8 corresponds to the carbon atom at 4-position of the benzene ring; peak at δ=112.9 corresponds to the carbon atom at 5-position of the benzene ring; peak at δ=102.6 corresponds to the carbon atom at 6-position of the benzene ring; peak at δ=128.4 corresponds to the carbon atom at 2-position of the thiophene ring; peak at δ=116.1 corresponds to the carbon atom at 5-position of the thiophene ring; peak at δ=127.6 corresponds to the carbon atom at 3-position of the thiophene ring; peak at δ=136.7 corresponds to the carbon atom at 4-position of the thiophene ring; peak at δ=64.3 corresponds to the carbon atom adjacent to quinoxaline at the 6-member ring linked to the thiophene ring; peak at δ=64.9 corresponds to the carbon atom away from quinoxaline at the 6-member ring linked to the thiophene ring; peak at δ=69.2 corresponds to the carbon atom proximate to the oxygen atom at the alkoxy group linked to 4-position of the benzene ring; peak at δ=69.1 corresponds to the carbon atom proximate to the oxygen atom at the alkoxy group linked to 3-position of the benzene ring; peak at δ=13.9-31.9 corresponds to other carbon atoms at the alkyl group.

The yield of the final product (referring to the product of reaction yields in five steps during preparing compound 8 from catechol) from the preparation in this example is about 28% with a purity of 95%.

EXAMPLE 2

The procedure in this example is the same as that in Example 1, except that dodecyl bromide is replaced with bromooctane in step (1). The resulting final product is poly[2,3-bis(3,4-dioctanoxyphenyl)-5,8-bis(3,4-ethylenedioxythienyl)quinoxaline]. The yield in step (1) is 80% with a purity of 95%. The polymer film formed by spraying has a transmittance of up to 72% in visible light region, and transmittance differences of 52% and 49% at 650 nm and 462 nm, respectively. The polymer has a somewhat low solubility such that longer time is required to completely dissolve the polymer in trichloromethane.

The polymer prepared in this example has a $M_n$ of 56000.

EXAMPLE 3

The procedure in this example is the same as that in Example 1, except that dodecyl bromide is replaced with bromononane in step (1). The resulting final product is poly[2,3-bis(3,4-dinonyloxyphenyl)-5,8-bis(3,4-ethylenedioxythienyl)quinoxaline]. The yield in step (1) is 80% with a purity of 95%. The polymer film formed by spraying has a transmittance of up to 68% in visible light region, and transmittance differences of 47% and 46% at 650 nm and 462 nm, respectively. The polymer has a somewhat low solubility such that longer time is required to completely dissolve the polymer in trichloromethane.

The polymer prepared in this example has a $M_n$ of 58000.

EXAMPLE 4

The procedure in this example is the same as that in Example 1, except that dodecyl bromide is replaced with bromodecane in step (1). The resulting final product is poly[2,3-bis(3,4-didecyloxyphenyl)-5,8-bis(3,4-ethylenedioxythienyl)quinoxaline]. The yield in step (1) is 80% with a purity of 95%. The polymer film formed by spraying has a transmittance of up to 70% in visible light region, and transmittance differences of 51% and 47% at 650 nm and 462 nm, respectively. The polymer has a somewhat low solubility such that longer time is required to completely dissolve the polymer in trichloromethane.

The polymer prepared in this example has a $M_n$ of 60000.

EXAMPLE 5

The procedure in this example is the same as that in Example 1, except that dodecyl bromide is replaced with bromododecane in step (1). The resulting final product is poly[2,3-bis(3,4-di(dodecyloxy)phenyl)-5,8-bis(3,4-ethylenedioxythienyl)quinoxaline]. The yield in step (1) is 80% with a purity of 95%. The polymer film formed by spraying has a transmittance of up to 67% in visible light region, and transmittance differences of 47% and 46% at 650 nm and 462 nm, respectively. The polymer has a somewhat low solubility such that longer time is required to completely dissolve the polymer in trichloromethane.

The polymer prepared in this example has a $M_n$ of 61000.

EXAMPLE 6

The procedure in this example is the same as that in Example 1, except that dodecyl bromide is replaced with bromotridecane in step (1). The resulting final product is poly[2,3-bis(3,4-di(tridecyloxy)phenyl)-5,8-bis(3,4-ethylenedioxythienyl)quinoxaline]. The yield in step (1) is 80% with a purity of 95%. The polymer film formed by spraying has a transmittance of up to 65% in visible light region, and transmittance differences of 45% and 43% at 650 nm and 462 nm, respectively. The polymer has a somewhat low solubility such that longer time is required to completely dissolve the polymer in trichloromethane.

The polymer prepared in this example has a $M_n$ of 61000.

EXAMPLE 7

The procedure in this example is the same as that in Example 1, except that dodecyl bromide is replaced with bromotetradecane in step (1). The resulting final product is poly[2,3-bis(3,4-di(tetradecyloxy)phenyl)-5,8-bis(3,4-ethylenedioxythienyl)quinoxaline]. The yield in step (1) is 80% with a purity of 95%. The polymer film formed by spraying has a transmittance of up to 63% in visible light region, and transmittance differences of 43% and 45% at 650 nm and 462 nm, respectively. The polymer has a somewhat low solubility such that longer time is required to completely dissolve the polymer in trichloromethane.

The polymer prepared in this example has a $M_n$ of 62000.

EXAMPLE 8

The preparation procedures in this example are specifically shown below:

(1) Catechol (55 g, 0.5 mol), potassium hydroxide (84.2 g, 1.5 mol), 200 ml of ethanol, and dodecyl bromide (375 g, 1.5 mol) are charged into a round bottom flask that is equipped with a condensation tube, and reacted at 80° C. for 10 h. The reactant is dissolved by addition of water, extracted with diethyl ether, and dried over anhydrous sodium sulfate. After passing through a chromatographic column, a white floccule solid is given, compound 1, with a yield of 67% and a purity of 95%.

(2) Compound 1 (8.92 g, 20 mmol), aluminum chloride (2.93 g, 22 mmol), and 50 ml of carbon disulfide are charged into a round bottom flask. Oxalyl Chloride (1.52 g, 12 mmol) is dissolved in 10 ml of carbon disulfide. The mixture is added dropwise at 0° C. to the flask and violently stirred for 18 hrs. The reactant is concentrated via rotary evaporation at reduced pressure. Deionized water is added and the resulting solution is extracted with dichlormethane. The organic phase is dried over anhydrous magnesium sulfate, concentrated via rotary evaporation at reduced pressure, and then passed through a chromatographic column, to give a white solid, compound 2, with a yield of 62% and a purity of 95%.

(3) 2,1,3-benzothiadiazole (10 g, 73.4 mmol) and 150 ml of hydrobromic acid (14% aqueous solution) are charged into a round bottom flask, to which a mixed solution of $Br_2$ (35.2 g, 220.3 mmol) and hydrobromic acid (100 ml) is added dropwise. The mixture is heated to 100° C., refluxed for 12 hrs, and then cooled to room temperature. An excess of sodium thiosulfate is added to the reaction to remove excess bromine. The crude is washed with water for several times and the resulting solid is washed once with diethyl ether. The solvent is evaporated to give compound 3 with a yield of 72% and a purity of 95%.

(4) Compound 3 (5 g, 17 mmol) and 170 ml of ethanol are charged into a round bottom flask, to which sodium borohydride (6.4 g, 170 mmol) is added in portions at 0° C. After completing the addition, the mixture is stirred at room temperature for 20 hrs. Appropriate deionized water is added and the reaction is extracted with diethyl ether. The organic phase is dried over anhydrous magnesium sulfate and passed through a chromatographic column, to give an of white flaky solid, compound 4, with a yield of 90% and a purity of 95%.

(5) Compound 2 (7.2 g, 7.6 mmol), compound 4 (2.0 g, 7.6 mmol), p-toluenesulfonic acid (0.07 g, 0.38 mmol) and 80 ml of ethanol are charged into a round bottom flask, refluxing at 80° C. for 12 hrs. The reaction is filtered to give a precipitate, which is washed with ethanol for several times. The crude is passed through a chromatographic column, to give a faint yellow solid, compound 5, with a yield of 69% and a purity of 95%.

(6) 3,4-ethylenedioxythiophene (0.77 g, 5.4 mmol) is dissolved in 30 ml of anhydrous tetrahydrofuran and cooled to −78° C. 2.7 ml of a solution of n-butyllithium in n-hexane at a concentration of 2.4M is added to the reaction system in 2 hrs at a constant speed. After that, the reaction is stirred for 0.5 hr, to which tributyltin chloride (2.1 g, 6.5 mmol) is injected and stirred for 0.5 h. The system is left at room temperature with stirring for 16 hrs. The solvent is removed via rotary evaporation, to give a yellow oily liquid, compound 6, with a yield of 53% and a purity of 95%.

(7) Compound 5 (1.77 g, 1 mmol) and compound 6 (1.1 g, 2.5 mmol) are charged into a round bottom flask, to which 20 ml of anhydrous THF and 0.056 g of palladium acetate catalyst are added. The reaction mixture is heated to 80° C. for 48 hrs. The solvent is removed via rotary evaporation. The residue is passed through a chromatographic column, to give an orange red solid, which is an electrochromic monomer, compound 7, with a yield of 63% and a purity of 95%.

(8) Compound 7 (0.94 g, 0.723 mmol) is added to 100 ml of trichloromethane, to which a solution of ferric trichloride (0.35 g, 2.169 mmol) in nitromethane is added dropwise and stirred at room temperature for 48 hrs. The resulting mixed solution is added to 800 ml of methanol. The mixture is filtered and the precipitate is remained. The precipitate is dissolved in trichloromethane, to which an excess of hydrazine hydrate is added and stirred for 8 hrs. The organic phase is taken, added to 800 ml of methanol and filtered. The resulting precipitate is washed with methanol for several times, to give a polymeric electrochromic material, compound 8, with a yield of 56% and a purity of 99%.

The polymer prepared in this example has a $M_n$ of 45000.

EXAMPLE 9

The preparation procedures in this example are specifically shown below:

(1) Catechol (55 g, 0.5 mol), potassium hydroxide (84.2 g, 1.5 mol), 200 ml of ethanol, and dodecyl bromide (375 g, 1.5 mol) are charged into a round bottom flask that is equipped with a condensation tube, and reacted at 60° C. for 4 h. The reactant is dissolved by addition of water, extracted with diethyl ether, and dried over anhydrous sodium sulfate. After passing through a chromatographic column, a white floccule solid is given, compound 1, with a yield of 48% and a purity of 95%.

(2) Compound 1 (8.92 g, 20 mmol), aluminum chloride (2.93 g, 22 mmol), and 50 ml of carbon disulfide are charged into a round bottom flask. Oxalyl Chloride (1.52 g, 12 mmol) is dissolved in 10 ml of carbon disulfide. The mixture is added dropwise at 0° C. to the flask and violently stirred for 24 hrs. The reactant is concentrated via rotary evaporation at reduced pressure. Deionized water is added and the resulting solution is extracted with dichlormethane. The organic phase is dried over anhydrous magnesium sulfate, concentrated via rotary evaporation at reduced pressure, and then passed through a chromatographic column, to give a white solid, compound 2, with a yield of 70% and a purity of 95%.

(3) 2,1,3-benzothiadiazole (10 g, 73.4 mmol) and 150 ml of hydrobromic acid (14% aqueous solution) are charged into a round bottom flask, to which a mixed solution of $Br_2$ (35.2 g, 220.3 mmol) and hydrobromic acid (100 ml) is added dropwise. The mixture is heated to 100° C., refluxed for 8 hrs, and then cooled to room temperature. An excess of sodium thiosulfate is added to the reaction to remove excess bromine. The crude is washed with water for several times and the resulting solid is washed once with diethyl ether. The solvent is evaporated to give compound 3 with a yield of 79% and a purity of 95%.

(4) Compound 3 (5 g, 17 mmol) and 170 ml of ethanol are charged into a round bottom flask, to which sodium borohydride (6.4 g, 170 mmol) is added in portions at 0° C. After completing the addition, the mixture is stirred at room temperature for 20 hrs. Appropriate deionized water is added and the reaction is extracted with diethyl ether. The organic phase is dried over anhydrous magnesium sulfate and passed through a chromatographic column, to give an offwhite flaky solid, compound 4, with a yield of 90% and a purity of 95%.

(5) Compound 2 (7.2 g, 7.6 mmol), compound 4 (2.0 g, 7.6 mmol), p-toluenesulfonic acid (0.15 g, 0.76 mmol) and 80 ml of ethanol are charged into a round bottom flask, refluxing at 60° C. for 12 hrs. The reaction is filtered to give a precipitate, which is washed with ethanol for several times. The crude is passed through a chromatographic column, to give a faint yellow solid, compound 5, with a yield of 70% and a purity of 95%.

(6) 3,4-ethylenedioxythiophene (0.77 g, 5.4 mmol) is dissolved in 30 ml of anhydrous tetrahydrofuran and cooled to −78° C. 2.7 ml of a solution of n-butyllithium in n-hexane at a concentration of 2.4M is added to the reaction system in 2 hrs at a constant speed. After that, the reaction is stirred for 1 hr, to which tributyltin chloride (2.1 g, 6.5 mmol) is injected and stirred for 0.5 h. The system is left at room temperature with stirring for 16 hrs. The solvent is removed via rotary evaporation, to give a yellow oily liquid, compound 6, with a yield of 63% and a purity of 95%.

(7) Compound 5 (1.77 g, 1 mmol) and compound 6 (1.1 g, 2.5 mmol) are charged into a round bottom flask, to which 20 ml of anhydrous THF and 0.056 g of bis(triphenylphosphine)palladium dichloride catalyst are added. The reaction mixture is heated to 80° C. for 24 hrs. The solvent is removed via rotary evaporation. The residue is passed through a chromatographic column, to give an orange red solid, which is an electrochromic monomer, compound 7, with a yield of 62% and a purity of 95%.

(8) Compound 7 (0.94 g, 0.723 mmol) is added to 100 ml of trichloromethane, to which a solution of ferric trichloride (0.58 g, 3.615 mmol) in nitromethane is added dropwise and stirred at room temperature for 24 hrs. The resulting mixed solution is added to 800 ml of methanol. The mixture is filtered and the precipitate is remained. The precipitate is dissolved in trichloromethane, to which an excess of hydrazine hydrate is added and stirred for 8 hrs. The organic phase is taken, added to 800 ml of methanol and filtered. The resulting precipitate is washed with methanol for several times, to give a polymeric electrochromic material, compound 8, with a yield of 56% and a purity of 99%.

The polymer prepared in this example has a $M_n$ of 40000.

EXAMPLE 10

Green Electrochromic Assembly (Electrochromic Film) and the Preparation Thereof

A solution of poly[2,3-bis(3,4-di(tridecyloxy)phenyl)-5,8-bis(3,4-ethylenedioxythienyl)quinoxaline] from Example 1 in trichloromethane is formulated at a concentration of 3 mg/ml. An even green film is formed by uniformly spraying the solution onto the ITO glass with an airbrush.

The green electrochromic material produced in this example has excellent property parameters. For example, the material exhibits coloring time and bleaching time of 2.0 s and 2.5 s, respectively. The film has high transparency. The film has a transmittance of up to 71% in visible light region, and transmittance differences of 53% and 48% at 650 nm and 462 nm, respectively.

The electrochromic film can be prepared by common technical means disclosed in the prior art, and preferably by the method in this example.

Figure 5:
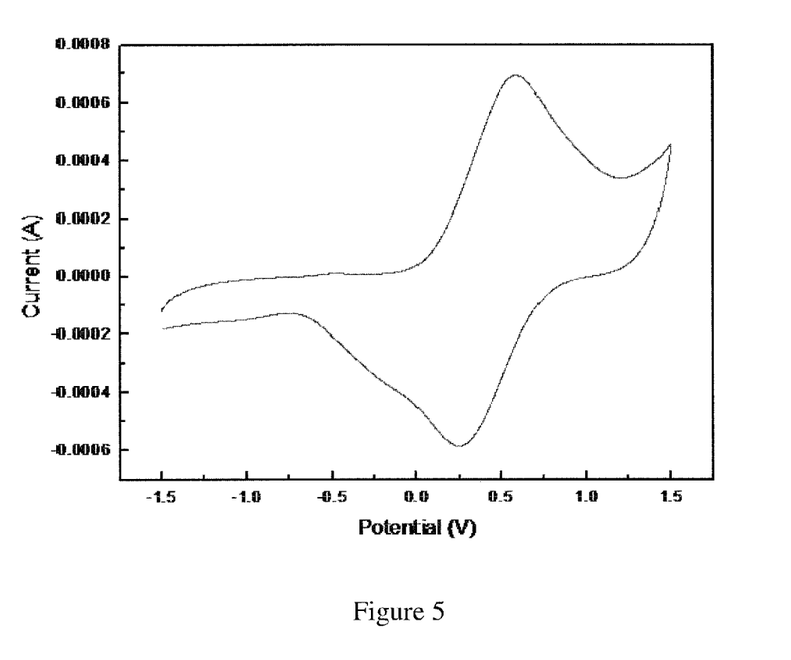
FIG. 5 shows cyclic voltammetry curves of a polymer film prepared according to Example 10 of the present invention, wherein Y-axis represents the magnitude of electric current, and X-axis represents applied voltage.

Cyclic voltammetry curves of the polymer film according to this example are shown in FIG. 5, wherein Y-axis represents the magnitude of electric current, and X-axis represents applied voltage. This figure shows that the oxidizing potential and reducing potential are 0.6V and 0.25V, respectively.

Figure 6:
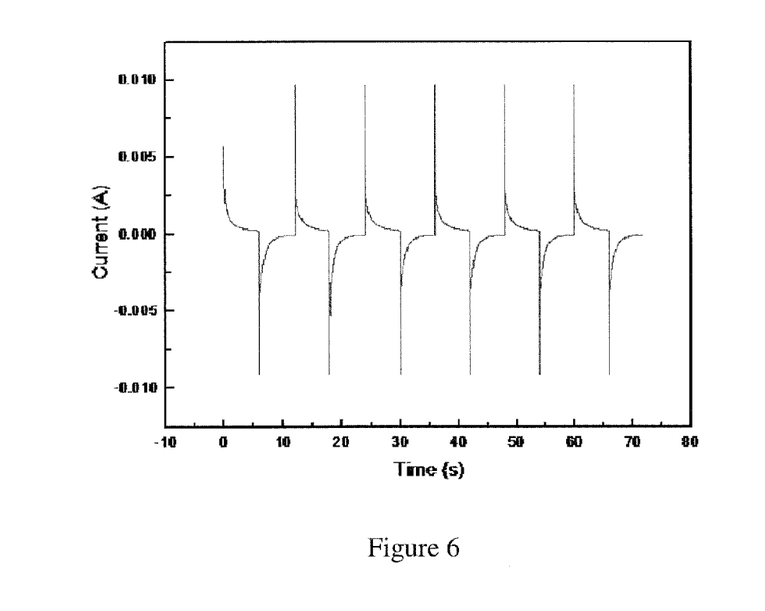
FIG. 6 shows a VSTEP curve of a polymer film prepared according to Example 10 of the present invention, wherein Y-axis represents the magnitude of electric current, and X-axis represents time.

A cyclic voltammetry curve of the polymer film according to this example is shown in FIG. 6, wherein Y-axis represents the magnitude of electric current, and X-axis represents time. Response time is defined as 95% of the time required by the current changing from the maximum to zero. The film exhibits coloring time and bleaching time of 2.0 s and 2.5 s, respectively.

Figure 7:
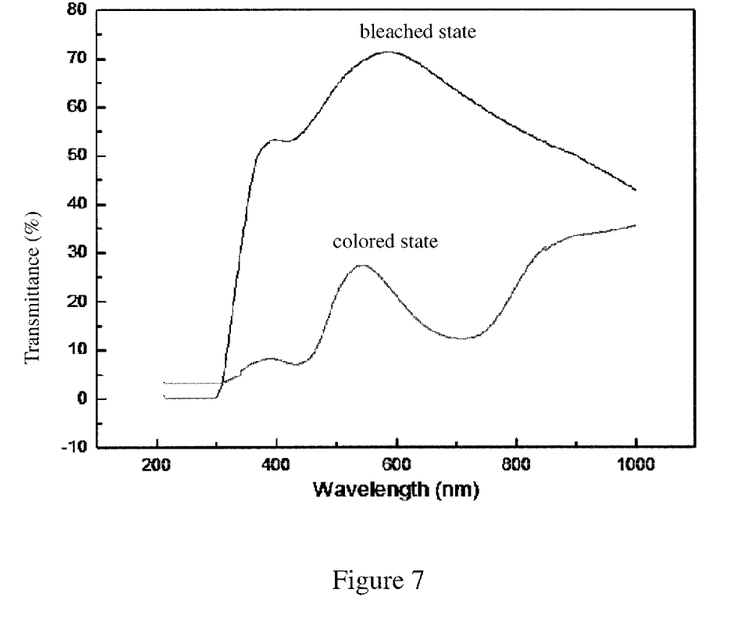
FIG. 7 is a schematic illustration of transmittance of colored state and bleached state of a polymer film prepared according to Example 10 of the present invention, wherein Y-axis represents transmittance, and X-axis represents wavelength.

Transmittance-wavelength curves of colored state and bleached state of the polymer film of this example are shown in FIG. 7, wherein Y-axis represents transmittance, and X-axis represents wavelength. It can be seen from the transmittance curve of bleached state of the polymer film that transmittance is up to 71% at 590 nm. The polymer film selectively transmits light in the range of wavelength of 500-600 nm, i.e., green light. It can be seen from the figure that contrast is greater than 5 in a large range of wavelength.

Figure 8:
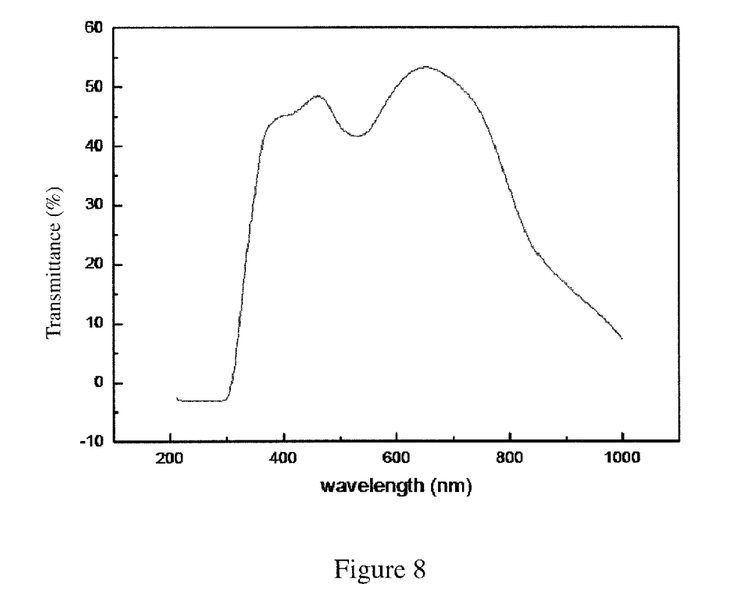
FIG. 8 is a schematic illustration of transmittance difference of colored state and bleached state of a polymer film prepared according to Example 10 of the present invention, wherein Y-axis represents transmittance, X-axis represents wavelength, and the values on Y-axis of the curve are generated by subtracting colored-state transmittance from bleached-state transmittance.

Transmittance difference-wavelength curve of colored state and bleached state of the polymer film of this example is shown in FIG. 8, wherein Y-axis represents transmittance, and X-axis represents wavelength. This curve is obtained by subtracting colored-state transmittance from bleached-state transmittance. It can be seen from the figure that the transmittance differences reach up to 53% and 48% at 650 nm and 462 nm, respectively.

EXAMPLE 11

Green Electrochromic Assembly (Electrochromic Film) and the Preparation Thereof

A solution of poly[2,3-bis(3,4-di(dodecyloxy)phenyl)-5,8-bis(3,4-ethylenedioxythienyl)quinoxaline] from Example 1 in dichloromethane is formulated at a concentration of 2 mg/ml. The polymer is difficult to dissolve and the resulting solution appears quite pale.

EXAMPLE 12

Green Electrochromic Assembly (Electrochromic Film) and the Preparation Thereof A solution of poly[2,3-bis(3,4-di(dodecyloxy)phenyl)-5,8-bis(3,4-ethylenedioxythienyl)quinoxaline] from Example 1 in trichloromethane is formulated at a concentration of 5 mg/ml. The concentration of the solution is too high such that it is difficult to form an even film during spraying.

The embodiments described in the above examples can be further combined or replaced. And the examples only illustrate preferred examples of the present invention, and are not intended to limit the spirit and scope of the present invention. Without departing from the spirit of the present invention, person of ordinary skill in the art can make various modifications or variations with regard to the technical solutions of the present invention, which will fall into the scope the invention.

This application claims priority to Chinese Patent Application No. 201310658615.9 filed on Dec. 6, 2013, the disclosure of which is incorporated herein in its entirety as part of the present application.

The invention claimed is:
1. A green polythiophene electrochromic material, poly[2,3-bis(3,4-di(dodecyloxy)phenyl)-5,8-bis(3,4-ethylenedioxythienyl)quinoxaline], as shown by formula (II), wherein, n is an integer from 40 to 200, having a number-average molecular weight of 50000-70000.

2. A method for preparing the green polythiophene electrochromic material of claim 1, comprising;
   Step 1: reacting catechol with alkyl bromide having a alkyl chain length of 8-14 carbon atoms in the presence of potassium hydroxide to give 1,2-dialkoxybenzene, compound 1;
   Step 2: allowing compound 1 and oxalyl chloride to undergo an electrophilic substitution reaction in the presence of anhydrous aluminum chloride, to give 1,2-bis(3,4-dialkoxyphenyl)-1,2-done, compound 2;
   Step 3: allowing 2,1,3-benzothiadiazole and bromine to undergo halogenation, to give 4,7-dibromo-2,1,3-benzothiadiazole, compound 3;

Step 4: allowing compound 3 and sodium borohydride to undergo a reduction reaction, to give 3,6-dibromo-o-phenylenediamine, compound 4;

Step 5: reacting compound 2 with compound 4 under the catalyzation of p-toluenesulfonic acid, to give 2,3-bis (3,4-dialkoxyphenyl)-5,8-dibromoquinoxaline, compound 5;

Step 6: reacting 3,4-ethylenedioxythiophene with n-butyllithium and tributyltin chloride, to give 2-tributyltin-3,4-ethylenedioxythiophene, compound 6;

Step 7: allowing compound 5 and compound 6 to undergo a stille coupling reaction under the catalyzation of bis(triphenylphosphine)palladium dichloride or palladium acetate, to give 2,3-bis(3,4-dialkoxyphenyl)-5,8-bis(3,4-ethylenedioxythienyl)quinoxaline, compound 7;

Step 8: polymerizing compound 7 under catalytic oxidation from ferric trichloride, to give poly[2,3-bis(3,4-dialkoxyphenyl)-5,8-bis(3,4-ethylenedioxythienyl)quinoxaline], compound 8.

3. The method of claim 2, wherein, in step 1, the ratio of catechol to alkyl bromide in mole is from 1:2 to 1:4, the reaction solvent is ethanol, the reaction temperature is from 60 to 80° C., and the reaction time is from 4 to 10 hours.

4. The method of claim 2, wherein, in step 2, the ratio of compound 1 to anhydrous aluminum chloride in mole is from 1:1 to 1:1.2, the ratio of compound 1 to oxalyl chloride in mole is from 1:0.5 to 1:0.6, the reaction solvent is carbon disulfide, the reaction temperature is 0° C., and the reaction time is from 18 to 24 hours.

5. The method of claim 2, wherein, in step 3, the ratio of 2,1,3-benzothiadiazole to bromine in mole is from 1:2 to 1:4, the reaction solvent is an aqueous hydrobromic acid solution at a mass concentration 14%, the reaction temperature is from 80 to 100° C., and the reaction time is from 8 to 12 hours.

6. The method of claim 2, wherein, in step 4, the ratio of compound 3 to sodium borohydride in mole is from 1:5 to 1:10, the reaction solvent is ethanol, and the reaction temperature is room temperature.

7. The method of claim 2, wherein, in step 5, the ratio of compound 2 to compound 4 in mole is from 1:1 to 1:12, the catalyst is p-toluenesulfonic acid in an amount of 5-10 wt % of compound 4, the reaction solvent is trichloromethane or ethanol, the reaction temperature is from 60 to 80° C., and the reaction time is from 10 to 12 hours.

8. The method of claim 2, wherein, in step 6, the ratio of 3,4-ethylenedioxythiophene to n-butyllithium in mole is from 1:1 to 1:1.2, the reaction is conducted at −78° C. with stirring for 0.5-1 hour, the ratio of 3,4-ethylenedioxythiophene to tributyltin chloride in mole is from 1:1 to 1:1.2, and the reaction is conducted at room temperature for 16-24 hours.

9. The method of claim 2, wherein, in step 7, the ratio of compound 5 to compound 6 in mole is from 1:2 to 1:2.5, the reaction solvent is anhydrous tetrahydrofuran, the catalyst is bis(triphenylphosphine)palladium dichloride or palladium acetate in an amount of 5-10 wt % of compound 5, the reaction temperature is from 70 to 100° C., and the reaction time is from 24 to 48 hours.

10. The method of claim 2, wherein, in step 8, the ratio of compound 7 to ferric trichloride in mole is from 1:3 to 1:5, and the reaction is conducted at room temperature with stirring for 24-48 hours.

11. Use of the green polythiophene electrochromic material of claim 1 for preparing a uniform electrochromic film, comprising
dissolving poly[2,3-bis(3,4-di(dodecyloxy)phenyl)-5,8-bis(3,4-ethylenedioxythienyl)quinoxaline]in trichloromethane to prepare a solution of 2-3 mg/ml, and
spraying the solution directly onto a surface of an ITO glass with an airbrush to form the uniform electrochromic film.

12. An assembly comprising the green polythiophene electrochromic material of claim 1.

13. The assembly of claim 12, wherein said assembly is an electrochromic film.

14. An assembly comprising the green polythiophene electrochromic material of claim 1.

15. The assembly of claim 14, wherein said assembly is an electrochromic film.

\* \* \* \* \*